United States Patent [19]

Portas

[11] Patent Number: 4,655,654

[45] Date of Patent: Apr. 7, 1987

[54] ADAPTOR FOR WORKPIECE FIXTURE

[76] Inventor: Alberto Portas, 49 Wollaston St., Cranston, R.I. 02910

[21] Appl. No.: 809,772

[22] Filed: Dec. 16, 1985

[51] Int. Cl.⁴ .............................................. B23D 3/06
[52] U.S. Cl. .................................. 409/220; 51/216 R; 82/40 R; 82/45; 269/60; 269/287; 269/902
[58] Field of Search ............... 409/219, 220; 82/33 R, 82/33 A, 40 R, 45; 51/216 R; 269/60, 287, 902

[56] References Cited

U.S. PATENT DOCUMENTS

| | | | |
|---|---|---|---|
| 2,679,400 | 5/1954 | Hawn et al. | 269/60 |
| 3,165,141 | 1/1965 | Tishken | 269/60 |
| 3,188,076 | 6/1965 | Pryor | 269/902 |
| 4,151,984 | 5/1979 | Zapart | 269/902 |
| 4,153,239 | 5/1979 | La Rocco | 269/902 |
| 4,583,432 | 4/1986 | Bricker | 82/45 |

*Primary Examiner*—Nicholas P. Godici
*Assistant Examiner*—Jerry Kearns
*Attorney, Agent, or Firm*—Salter & Michaelson

[57] ABSTRACT

An adaptor for securing an elongated workpiece, such as an elongated pin, in a workpiece fixture is disclosed, wherein the adaptor is adjustable for repositioning the workpiece to facilitate a machining operation thereon. The adaptor includes a holding assembly for holding a workpiece in the adaptor and a securing assembly for securing the holding assembly in a workpiece fixture so that the workpiece and the holding assembly are repositionable with respect to the fixture. In a first embodiment of the adaptor, the securing assembly is operable for repositioning the holding assembly in a horizontal direction which is substantially perpendicular to the longitudinal extent of the workpiece, whereas in a second embodiment of the adaptor the securing assembly is operable for repositioning the holding assembly in both horizontal and vertical directions.

3 Claims, 6 Drawing Figures

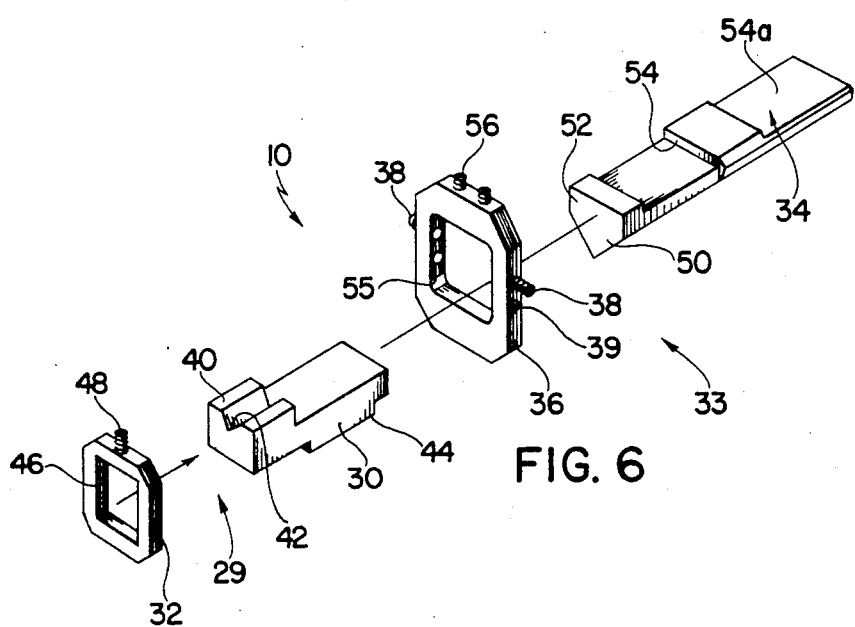

ADAPTOR FOR WORKPIECE FIXTURE

BACKGROUND AND SUMMARY OF THE INVENTION

The instant invention relates to machine tools and more particularly to an adaptor for providing increased adjustability in a fixture of the type used for holding a workpiece during a machining operation.

Several types of fixtures have been heretofore available for securing and positioning workpieces, such as elongated pins and the like, in predetermined orientations during machining operations. In this connection, fixtures known as collets which are adapted for receiving and securing workpieces, such as pins, during machining operations have been heretofore available; although they have generally not been adjustable for repositioning workpieces secured therein, and hence they have been less than entirely satisfactory for many applications. In addition, V-block fixtures which have V-shaped notches therein and which are adapted for receiving and securing workpieces, such as pins, in the V-shaped notches thereof have also been heretofore available. However, while many of the heretofore available V-blocks have been adjustable for repositioning workpieces along substantially vertical axes, they have generally not been adjustable along horizontal axes, and hence they have also been less than entirely satisfactory for many applications. Further, although other types of workholding apparatus have also been heretofore available, they have generally either not been fully adjustable and/or they have only been adapted for relatively expensive constructions.

Devices representing the closest prior art to the instant invention of which the applicant is aware are disclosed in the U.S. patents to PANZER, U.S. Pat. No. 2,242,791; TILLETT, U.S. Pat. No. 2,389,243; SCHNEIDER, U.S. Pat. No. 2,455,024; SHANLEY, U.S. Pat. No. 2,794,433; KULICKE, JR., U.S. Pat. No. 3,046,006; PRYOR, U.S. Pat. No. 3,188,076; and LA ROCCO, U.S. Pat. No. 4,070,012. However, while the devices disclosed in these references are all adapted for holding and securing workpieces and/or tools during machining operations, they are either not adapted to be effectively adjustable or they are only adapted for relatively expensive constructions.

The instant invention provides an effective adaptor which can be utilized for securing workpieces, such as elongated pins and the like, in workpiece fixtures, such as collets and/or V-blocks. In this regard, the adaptor of the instant invention, in its first embodiment, comprises a holding assembly for receiving and holding a workpiece in an orientation wherein it projects outwardly from the holding assembly, and a securing assembly for securing the holding assembly in a fixture so that it is repositionable with respect thereto along a first direction which is substantially perpendicular to the longitudinal extent of the workpiece. More specifically, the securing assembly preferably comprises a shaft which extends in substantially the opposite direction from the workpiece and in substantially parallel relation thereto, so that the shaft is receivable in a workpiece fixture, such as a a V-block, for securing the holding assembly so that it is adjustably repositionable with respect to the shaft and the fixture. This embodiment of the device is particularly adapted for use in combination with a V-block fixture of the type which is adjustable along a single direction which is substantially perpendicular to the longitudinal extent of the workpiece and also substantially perpendicular to the first direction in which the securing assembly is adjustable. The holding assembly of the adaptor preferably comprises a first carriage having a V-shaped notch therein and a workpiece clamp for securing a workpiece in the notch in the first carriage, and the shaft and the workpiece carriage are preferably constructed so that they are receivable in a slidable interfitting relation, wherein they are repositionable with respect to each other in the first direction. When the adaptor is constructed in this manner, the securing assembly preferably further comprises a first adjustment carriage clamp for adjustably securing the shaft and the first adjustment carriage in various adjusted positions, and the first adjustment carriage clamp includes a screw element which is engageable with the first adjustment carriage for adjustably securing it in various positions with respect to the shaft. Further, the first adjustment carriage clamp is preferably constructed as a collar which is receivable in encircling relation around the first adjustment carriage and the shaft.

A second embodiment of the adaptor of the instant invention comprises a holding assembly for holding a workpiece in a fixed orientation, wherein it projects outwardly from the holding assembly and a securing assembly for securing the holding assembly in a fixture so that it is repositionable with respect thereto along a first direction which is substantially perpendicular to the longitudinal extent of the workpiece and so that it is also repositionable with respect thereto along a second direction which is substantially perpendicular to the first direction and also substantially perpendicular to the longitudinal extent of the workpiece. In this embodiment of the adaptor, the securing assembly preferably comprises a shaft which extends in substantially the opposite direction from the workpiece in substantially parallel relation thereto, and the shaft is receivable in a fixture, such as a collet, for attaching the securing assembly thereto so that the workpiece is adjustably positionable along two substantially perpendicular axes with respect to the shaft and the fixture. In this embodiment of the adaptor, the securing assembly preferably comprises a first adjustment assembly which is operative for adjustably securing the holding assembly in the first direction and a second adjustment assembly which is attached to the first adjustment assembly and which is operative for adjustably securing the holding assembly in the second direction. In this embodiment of the adaptor, the holding assembly preferably comprises a first carriage having a V-shaped notch therein and a workpiece clamp for securing a workpiece in the notch in the first carriage, and the first adjustment assembly preferably comprises a mounting block which is attached to the second adjustment assembly so that it extends outwardly therefrom, and the shaft preferably extends outwardly from the second adjustment assembly in substantially the opposite direction from the mounting block. Further, the mounting block and the first carriage are preferably constructed so that they are receivable in an interfitting relation, wherein they are slidable with respect to each other in the first direction, and the first adjustment assembly preferably further comprises a first carriage clamp for securing the mounting block and the first adjustment carriage in various adjusted positions, and the first adjustment carriage clamp comprises a screw element which is engageable with the first adjustment carriage for securing it in various laterally adjusted positions with respect to the mounting block. Still further, in this embodiment of the adaptor, the second adjustment assembly preferably comprises a second adjustment carriage and a second slide which are constructed so that they are receivable in interfitting relation and therefore slidable with respect to each other in the second direction, and means is also provided for securing the second slide with respect to the second adjustment carriage in various adjusted positions. Further, in this embodiment of the device, the shaft preferably extends from the second adjustment carriage, and the mounting block extends from the slide.

Accordingly, it is a primary object of the instant invention to provide an effective adaptor which is operable for adjustably securing a workpiece, such as an elongated pin, in a fixture so that a machining operation can be performed on the workpiece.

Another object of the instant invention is to provide an adaptor for adjustably securing a workpiece in a V-block.

A further object of the instant invention is to provide an adaptor for adjustably securing a workpiece in a collet.

An even further object of the instant invention is to provide a relatively inexpensive adaptor which is operative for adjustably securing a workpiece in a workpiece fixture.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 6 is an exploded perspective view of the first embodiment of the adaptor.

DESCRIPTION OF THE INVENTION

Figure 1:
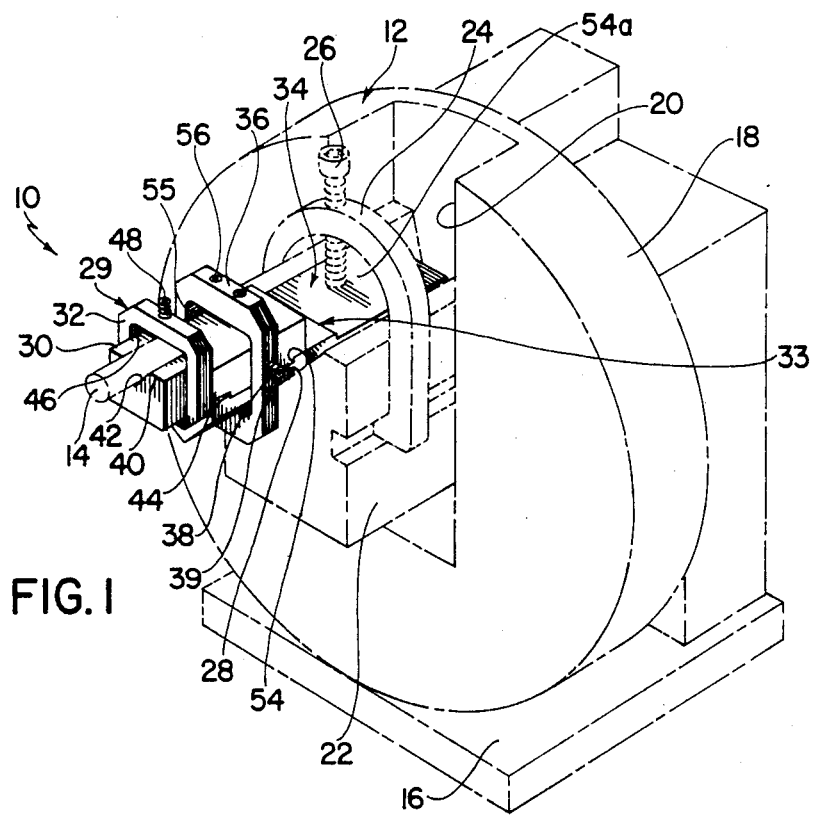
FIG. 1 is a perspective view of a first embodiment of the adaptor of the instant invention secured in a V-block.
Figure 2:
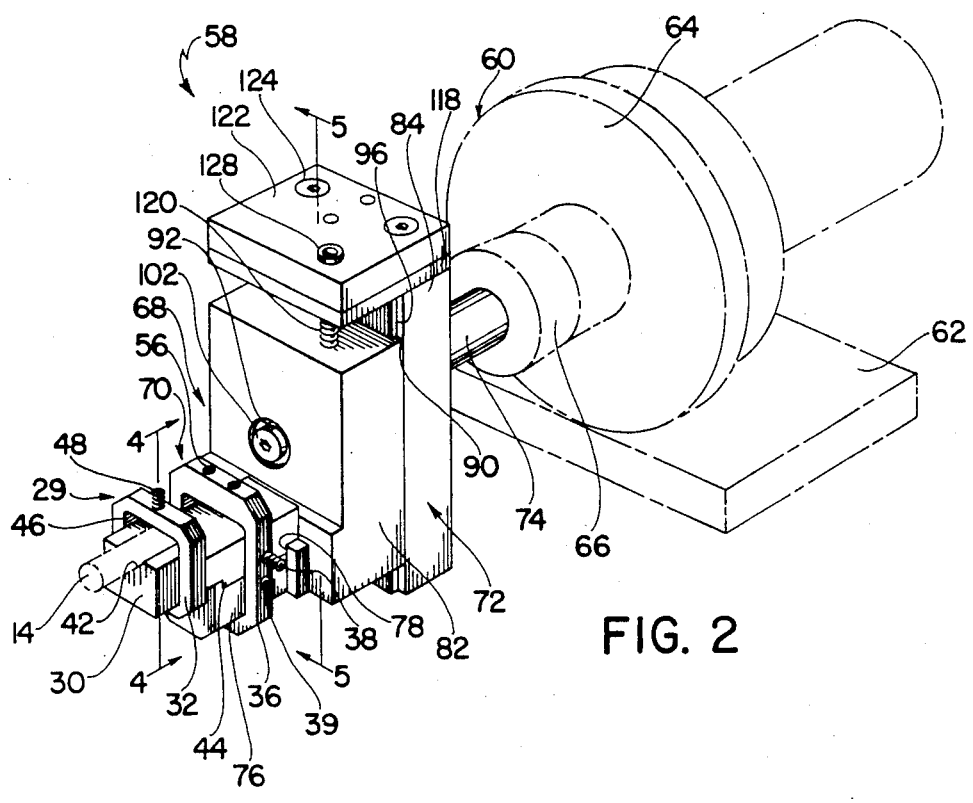
FIG. 2 is a perspective view of a second embodiment of the adaptor of the instant invention secured in a collet.
Figure 3:
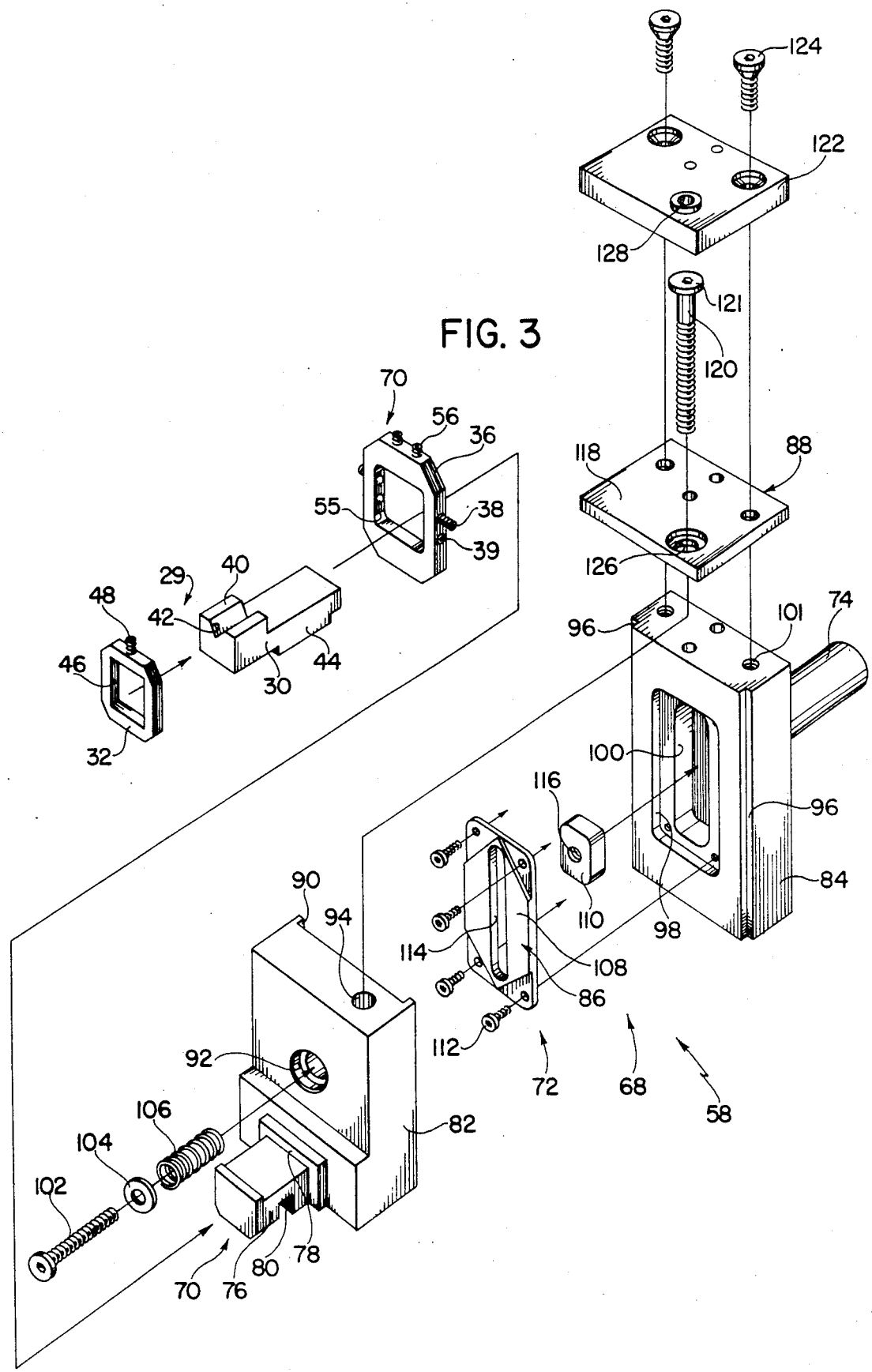
FIG. 3 is an exploded perspective view of the second embodiment of the adaptor.
Figure 4:
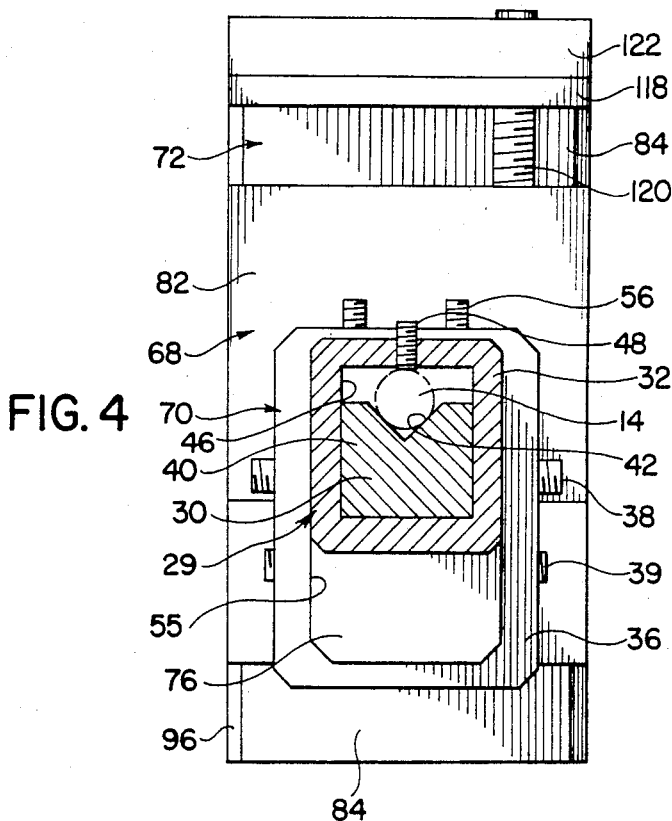
FIG. 4 is a sectional view taken along line 4—4 in FIG. 2.
Figure 5:
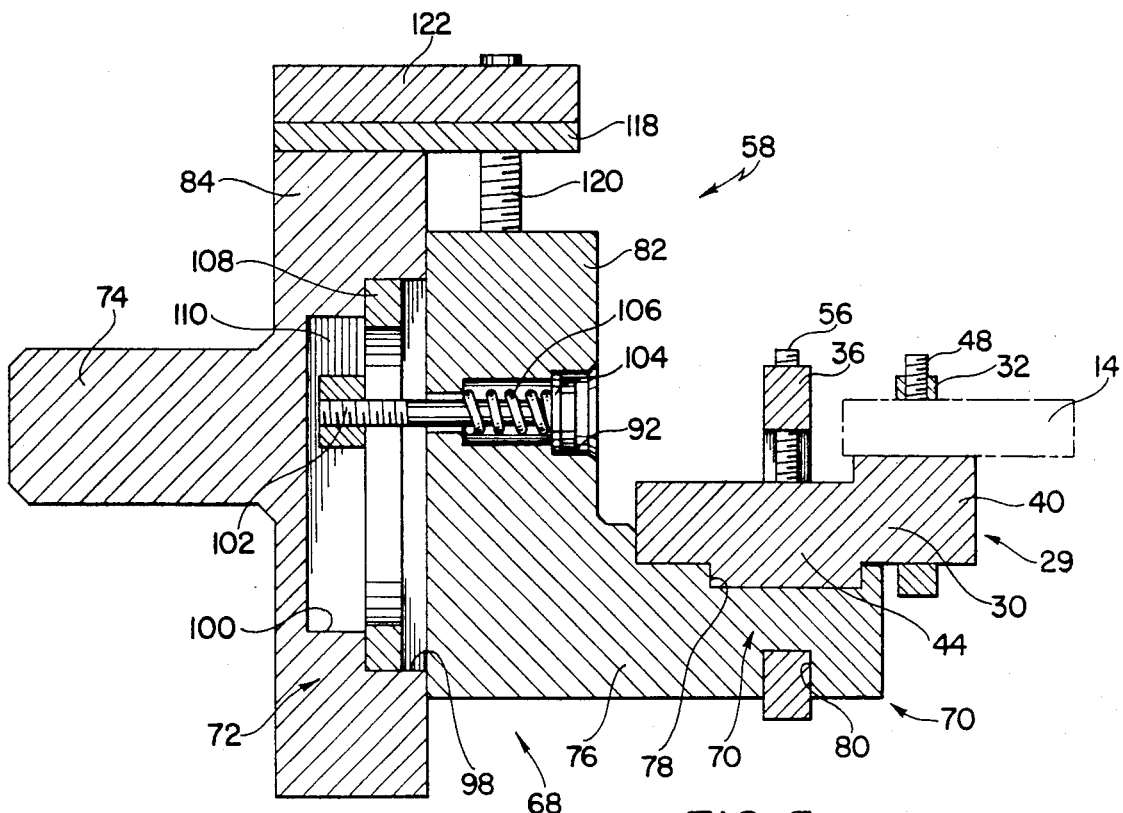
FIG. 5 is a sectional view taken along line 5—5 in FIG. 2.

Referring now to the drawings, a first embodiment of the adaptor of the instant invention is illustrated and generally indicated at 10 in FIGS. 1 and 6. The adaptor 10 is operative in combination with a V-block of the type generally indicated at 12 in FIG. 1 for adjustably securing a workpiece 14 so that a machining operation, such as a grinding process, can be performed on the workpiece 14.

The V-block 12 is preferably of conventional construction, and it comprises a base 16, a body 18 which is mounted on the base 16 and has a channel 20 therein, a slide block 22 and a clamp 24 which includes a clamp screw 26. The base 16 is securable on a work stand, and the slide block 22 is received in the channel 20 so that it is adjustably securable at various positions therein. The slide block 22 has a V-shaped notch 28 therein, and the clamp 24 is operative for securing an element, such as a workpiece, in the notch 28 by tightening the clamp screw 26. Accordingly, when a workpiece is received and secured in the notch 28, it is adjustably positionable along a substantially vertical axis with respect to the body 18 by repositioning the slide block 22 in the channel 20. However, a workpiece which is received in the notch 28 is not normally otherwise adjustably positionable with respect to the body 18.

The adaptor 10 is receivable and securable in the notch 28 in the V-block 12 for providing increased adjustability therein. In this connection, the adaptor 10 comprises a holding assembly generally indicated at 29, which includes a first carriage 30 and a workpiece clamp 32, and a securing assembly generally indicated at 33 which includes a shaft generally indicated at 34, and a first carriage clamp 36 having a pair of first adjustment screws 38, and a pair of second adjustment screws 39.

Referring first to the holding assembly 29, the first carriage 30 has an enlarged terminal end portion 40 in which a longitudinally extending V-shaped notch 42 is formed, and a substantially rectangular transversely extending foot 44 is formed on the underside of the carriage 30. The clamp 32 comprising a collar which is formed in a generally ring-like configuration with a substantially rectangular opening 46 therein, and it is dimensioned and configured to be received in encircling relation around the enlarged terminal end portion 40 of the carriage 30. A holding screw 48 extends inwardly from the upper portion of the clamp 32 so that it is aligned with the notch 42 when the clamp 32 is received on the terminal end portion 40 of the carriage 30. Accordingly, the holding screw 48 is operative for securing a workpiece, such as the pin 14, in the notch 42 so that the workpiece 14 extends longitudinally outwardly therefrom as illustrated in FIG. 1.

Referring now to the securing assembly 33, the shaft 34 has a five-sided sectional configuration which is defined by a lower portion 50 of substantially triangular sectional configuration and an upper portion 52 which is integrally formed with the lower portion 50. The lower portion 50 is dimensioned and configured to be received in the notch 28 in the V-block 12, whereas the upper portion 52 provides increased strength and structural rigidity in the shaft 34. An upwardly facing substantially transversely extending trackway 54 is formed in the upper portion 52, and it is dimensioned and configured to receive the foot 44 therein in interfitting relation so that the carriage 30 is slidable in a direction which is substantially perpendicular to extent of the shaft 34, and a recessed surface 54a is formed on the rear portion of the shaft 34. The clamp 36 is formed as a collar which is of generally ring-like configuration, and it has a rectangular opening 55 therein which is dimensioned and configured to loosely receive the carriage 30 and the shaft 34 therein when the carriage 30 is received in interfitting relation with the shaft 34. The second adjustment screws 39 extend inwardly from opposite sides of the clamp 36 and are positioned so that they are engageable with the shaft 34 for securing the clamp 36 thereon; and the first adjustment screws 38 extend inwardly from opposite sides of the clamp 36 and are positioned so that they are engageable with the carriage 30. Accordingly, since the opening 55 is somewhat greater in width than either the carriage 30 or the shaft 34, the carriage 30 is laterally slidable with respect to the shaft 34 when the carriage 30 and the shaft 34 are received in the clamp 36; and, as a result, the carriage 30 and the shaft 34 are securable in various adjusted positions with the screws 38 and 39. A pair of fixation screws 56 extend downwardly from the upper portion of the clamp 36 and are engageable with the carriage 30 for further securing it in a predetermined adjusted position with respect to the shaft 34.

For use and operation of the adaptor 10 in combination with the V-block 12, the workpiece 14 is assembled in the notch 42 in the carriage 30, the clamp 32 is assembled in encircling relation around the workpiece 14 and the carriage 30, and the screw 48 is tightened to secure the workpiece 14 in the notch 42. Further, the carriage 30 is assembled in interfitting relation with the shaft 34 so that the foot 44 can travel laterally in the trackway 54, and the clamp 36 is assembled in encircling relation around the carriage 30 and the shaft 34. The shaft 34 is then assembled in the notch 28 of the slide block 22, and the screw 26 is tightened so that it engages the surface 54a of the shaft 34 to secure the adaptor 10 in the V-block 12. The V-block 12 is then adjusted to vertically reorient the workpiece 14 to the desired extent, and the adaptor 10 is adjusted to laterally reposition the workpiece 14 to the desired extent. In this regard, the first adjustment screws 38 and/or the second adjustment screws 39 on the clamp 36 can be manipulated to laterally reposition the carriage 30 with respect to the shaft 34 in order to reposition the workpiece 14 in a direction which is substantially perpendicular to the axial extent of the shaft and also substantially perpendicular to the extent of the channel 20. Thereafter the fixation screws 56 can be tightened to secure the carriage 30 with respect to the shaft 34. Finally, after the workpiece 14 has been properly oriented and secured in the fixture 12, a machining operation, such as a grinding process, can be accurately and effectively performed thereon.

Referring now to FIGS. 2-5, a second embodiment of the adaptor of the instant invention is illustrated and generally indicated at 58. The adaptor 58 is constructed so that it is receivable in a collet, such as the collet generally indicated at 60 in FIG. 2, in order to adjustably position a workpiece 14 with respect to the collet 60 so that the workpiece 14 can be effectively secured in a predetermined orientation for performing a machining operation thereon.

The collet 60 is preferably of conventional construction, and it includes a base 62, a body 64 which is secured on the base 62 and a chuck 66 which is operative for receiving and securing a shaft in the collet 60. The collet 60 is, however, not normally adjustable for reorienting a workpiece which is secured therein.

The adaptor 58 comprises a holding assembly 29 of the type hereinabove described, and a securing assembly generally indicated at 68 which is receivable in the collet 60 and operative for securing the holding assembly 29 in a manner which allows the workpiece 14 to be adjustably repositioned in a first direction which is substantially perpendicular to the axial extent of the workpiece 14 and adjustably repositioned in a second direction which is substantially perpendicular to both the first direction and to the axial extent of the workpiece 14. In this regard, the securing assembly 68 comprises a first adjustment assembly generally indicated at 70 to which the holding assembly 29 is attached and a second adjustment assembly generally indicated at 72 to which the first adjustment assembly 70 is attached, the second adjustment assembly 72 including a shaft 74 which extends in substantially the opposite direction from the workpiece 14 and which is receivable in the chuck 66 of the collet 60 for securing the adaptor 58 thereto.

The holding assembly 29 is substantially the same as the holding assembly 29 hereinabove described with respect to the adaptor 10 and it includes a carriage 30 and a clamp 32.

The first adjustment assembly 70 comprises a mounting block 76 and a clamp 36 of the type hereinabove described having a pair of first adjustment screws 38, a pair of second adjustment screws 39, and a pair of fixation screws 56. The mounting block 76 is integrally formed with the second adjustment assembly 72 and it extends therefrom in a direction which is substantially parallel to and opposite from the shaft 74. The mounting block 76 has an upwardly facing, laterally extending trackway 78 formed therein which is dimensioned and configured to slidably receive the foot 44 of the carriage 30 in interfitting relation therein, and a downwardly facing channel 80 extends transversely across the underside of the mounting block 76, the channel 80 being dimensioned to receive the clamp 36 therein. Accordingly, it is seen that the carriage 30 is receivable in assembled relation with the mounting block 76, and the clamp 36 is operative for securing the carriage 30 on the mounting block 76 so that it is laterally repositionable with respect thereto and securable in various laterally adjusted positions by means of the screws 38, 39 and 56 in the manner hereinabove described with regard to the carriage 30 and the shaft 34 of the adaptor 10.

The second adjustment assembly 72 comprises a slide 82, a second carriage 84, a retainer assembly 86, an adjustment screw assembly 88, and the shaft 74. The slide 82 has a pair of substantially parallel vertically disposed rearwardly extending track elements 90 formed along the vertical rear edges thereof, whereas the mounting block 76 extends forwardly from the lower portion of the slide 82. An aperture 92 extends rearwardly through the slide 82, and a substantially vertically disposed threaded aperture 94 extends downwardly into the slide 82 from the upper surface thereof. The second carriage 84 is dimensioned and configured to be slidably received in interfitting relation with the slide 82, and it includes a pair of spaced, substantially parallel, vertically disposed grooves 96 which are formed along the forward side portions thereof for slidably receiving the tracks 90. A forwardly facing vertically oriented recess 98 is formed in the second carriage 84, and an elongated substantially vertically disposed inner channel 100 is formed in the recess 98. A plurality of threaded apertures 101 are formed in the second carriage 84 so that they extend downwardly from the upper surface thereof.

The retainer assembly 86 comprises a screw 102, a washer 104, a spring 106, a retainer plate 108, a retainer block 110, and a plurality of screws 112. The washer 104 and the spring 106 are received on the screw 102 in front of the slide 82, and the screw 102 extends rearwardly through the aperture 92. The plate 108 has a substantially vertically disposed slot 114 therein which is dimensioned and configured to slidably receive the screw 102, and the retainer plate 108 is dimensioned and configured to be received in the recess 98 and secured therein with the screws 112. The retainer block 110 is dimensioned and configured to be slidably received in the channel 100 behind the retainer plate 108, and it has a threaded aperture 116 therein. Accordingly, in assembled relation, the screw 102 extends rearwardly through the slide 82 and is received in the slot 114, and the terminal end of the screw 102 is received in threaded engagement in the aperture 116 in the retainer block 110. The retainer plate 108 is secured in the recess 98 with the screws 112, and therefore the retainer assembly 86 operates to secure the slide 82 to the carriage 84 in a manner which allows it to be vertically repositioned with respect thereto.

The adjustment screw assembly 88 comprises a retainer plate 118, an adjustment screw 120 having a head 121, a cover plate 122 and a pair of screws 124. The adjustment screw 120 has a hexagonal socket formed in the head 121 thereof so that it can be manipulated with an Allen wrench, and it is received through an aperture 126 in the retainer plate 118 and received in threaded engagement in the aperture 94 in the slide 82. The retainer plate 118 is received on the upper surface of the carriage 84, and the cover plate 122 is received over the retainer plate 118 and the head 121 of the screw 120. The cover plate 122 is secured to the carriage 84 with the screws 124 which are received in the threaded apertures 101, whereby the screws 124 and the cover plate 122 also cooperate to secure the retainer plate 118. A reduced aperture 128 which is smaller in dimension than the head 121 of the screw 120 extends through a raised boss on the upper surface of the retainer plate 122 and is aligned with the screw 120 so that the screw 120 can be rotated by means of an Allen wrench which is inserted through the aperture 128. However, since the aperture 128 is smaller in dimension than the head 121 of the screw 120, the head 121 is captured between the plates 118 and 122 so that it cannot be axially repositioned with respect thereto or with respect to the carriage 84. However, by rotating the screw 120 so that it rotates in the threaded aperture 94, the screw 120 can be axially repositioned with respect to the slide 82, and therefore the slide 82 can be vertically reoriented with respect to the carriage 84.

Accordingly, for use and operation of the adaptor 58, it is assembled with a collet, such as the collet 60 so that the shaft 74 is received in the chuck 66. The workpiece 14 is assembled in the holding assembly 29 in the manner hereinabove set forth, and the carriage 30 is assembled with the mounting block 76. The clamp 36 is then operated to laterally reorient the workpiece 14 to a desired position by manipulating the first and second adjustment screws 38 and 39, respectively; and thereafter the fixation screws 56 are tightened to further secure the workpiece 14 in the desired laterally adjusted position. In addition, the screw 120 is adjusted by inserting an appropriate Allen wrench through the aperture 128 so that it is received in the head 121 of the screw 120 and rotating the screw 120 with the Allen wrench to the desired extent. In this manner, the slide 82 is vertically reoriented with respect to the carriage 84 so that the workpiece 14 is reoriented in a desired vertically adjusted position. Thereafter, a machining operation can be effectively and accurately performed on the workpiece 14; and if needed, the workpiece 14 can be vertically and/or laterally reoriented to a further extent at any time.

It is seen, therefore, that the instant invention provides and effective adaptor for securing a workpiece in a workpiece fixture so that the workpiece is adjustably positionable with respect to the fixture. The adaptor 10 is particularly effective for use in combination with a V-block since it allows the workpiece 14 to be laterally repositioned with respect to the V-block. The adaptor 58, on the other hand, is particularly effective for use in combination with a collet, such as the collet 60, since it allows a workpiece 14 to be both vertically and laterally repositioned with respect thereto. Further, due to the relatively simple constructions of the adaptor 10 and the adaptor 58, they can be effectively made in relatively inexpensive constructions so that they are practical for use in relatively small scale machining operations. Hence, it is seen that the instant invention represents a significant advancement in the machine tool art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An adaptor for securing an elongated workpiece in a workpiece fixture so that the workpiece is adjustably positionable with respect to the fixture comprising:
   (a) holding means for holding said workpiece in a fixed orientation with respect thereto wherein it projects outwardly from said holding means, said holding means comprising a first carriage and workpiece clamp means for securing said workpiece on said first carriage; and
   (b) means for securing said holding means in said fixture comprising a shaft which extends in substantially the opposite direction from said workpiece in substantially parallel relation thereto, said shaft being receivable in said fixture for attaching said securing means thereto, a first adjustment assembly operative for adjusting the position of said holding means in a first direction which is substantially perpendicular to the extent of said shaft and a second adjustment assembly attached to said first adjustment assembly and operative for adjusting the position of said holding means in a second direction which is substantially perpendicular to both said first direction and said shaft, said first adjustment assembly comprising a mounting block which is attached to said second adjustment assembly, said shaft extending from said second adjustment assembly in substantially the opposite direction from said mounting block and in substantially parallel relation thereto, said mounting block and said first carriage being received in interfitting relation and being slidable with respect to each other along said first direction, and first carriage clamp means for adjustably securing said mounting block and said first carriage in interfitting relation, said first carriage clamp means including screw means engageable with one of said mounting block or said first carriage for adjustably securing said first carriage in various laterally adjusted positions with respect to said mounting block.

2. In the adaptor of claim 1, said first carriage clamp means comprising a collar which is received in encircling relation around said first carriage and said mounting block.

3. In the adaptor of claim 1, said second adjustment assembly comprising a second carriage and a slide, said second carriage and said slide being received in interfitting relation and being slidable with respect to each other along said second direction, said shaft extending from one of said second carriage or said slide, said mounting block extending from the other of said second carriage or said slide, said second adjustment assembly further comprising means securing said second carriage and said slide in interfitting relation so that they are slidably adjustable along said second direction.

* * * * *